(No Model.)
C. E. WINTRODE.
TENSION DEVICE.
No. 468,717. Patented Feb. 9, 1892.
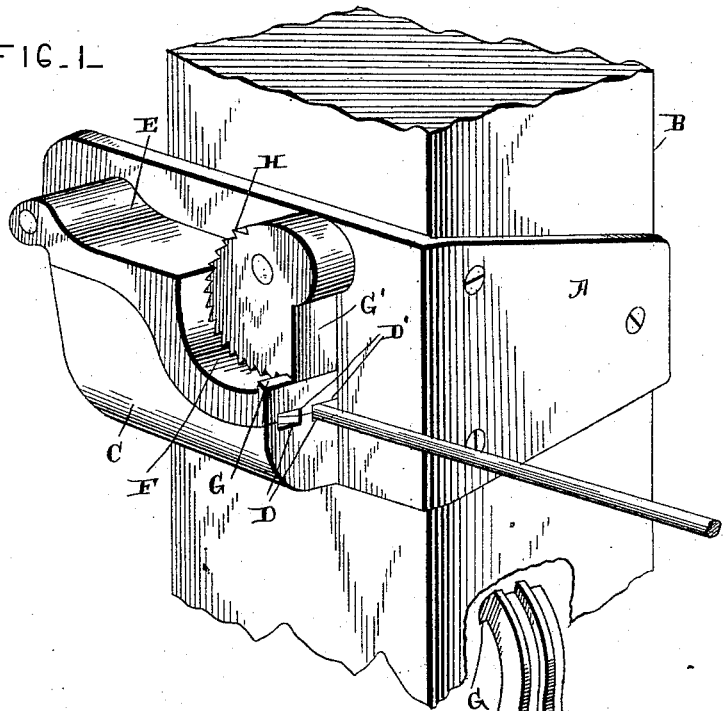
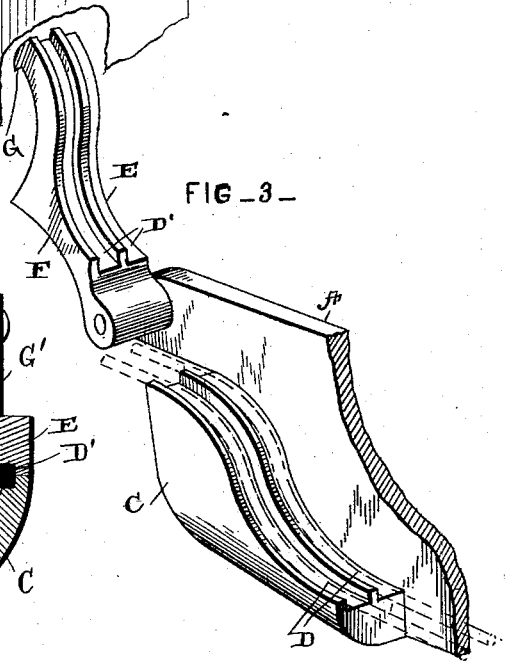
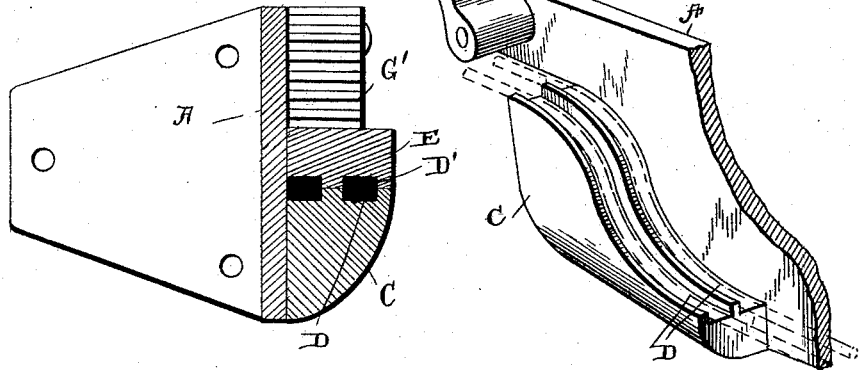
WITNESSES
Geo. E. Frech.
R. A. Fitzgerald
INVENTOR
Charles E. Wintrode
per Lehmann & Pattison
attys.

UNITED STATES PATENT OFFICE.

CHARLES E. WINTRODE, OF HUNTINGTON, INDIANA.

TENSION DEVICE.

SPECIFICATION forming part of Letters Patent No. 468,717, dated February 9, 1892.

Application filed September 17, 1891. Serial No. 405,988. (No model.)

*To all whom it may concern:*

Be it known that I, CHARLES E. WINTRODE, of Huntington, in the county of Huntington and State of Indiana, have invented certain new and useful Improvements in Tension Devices; and I do hereby declare the following to be a full, clear, and exact description of the invention, such as will enable others skilled in the art to which it pertains to make and use it, reference being had to the accompanying drawings, which form part of this specification.

My invention relates to an improvement in tension devices; and it consists in certain novel features of construction, which will be fully described hereinafter, and more particularly referred to in the annexed claims.

My invention is directed more especially to that class of tension devices which are used in connection with fence-wiring machines, in which it is necessary to keep the wires tightly stretched as they are fed from the supply-reels to the point where the pickets are being woven therein.

In the accompanying drawings, Figure 1 is a perspective view of my improved device shown in its operative position. Fig. 2 is a sectional view of the same. Fig. 3 is a detached perspective view of the clamping-jaws.

A represents an angular frame, which is secured to a post B or any other convenient object, and to one side of this angular portion is secured the projection C, which has a curved upper edge, as shown. This curved edge is constructed with the parallel grooves D, through which the wires pass as they leave the supply-reels. Pivoted to the outer end of the portion A is the clamping-plate E, which has a curved under edge adapted to fit closely the upper edge of the portion C. The curved edge of this pivoted portion is also provided with grooves D', which register with the grooves D, thus making an inclosed passage for the wires.

The forward end of the plate E is curved inward, as shown at F, and the lower end of this curved portion terminates in a projecting edge G. Pivoted to the portion A and adapted to swing in the curved outspace F is the dog G', having ratchet-teeth H on its lower curved edge, which, when the dog is turned down, engage the edge G, and by this means the clamping-plate is held at any desired pressure against the wires.

When it is desired to remove the wires or place them within the device, the dog is turned upon its pivot and the plate E turned upward, thus leaving the curved upper edge of the portion C open and unobstructed.

By having the dog G' pivoted eccentrically, as shown, it will be seen that as it is turned down its pressure upon the plate E is increased, and thus any desired tension may be had upon the wires. The teeth upon the dog are so arranged as to slip freely over the edge G while the former is being turned into the curved surface F; but the teeth engage the edge G when the dog is moved in the opposite direction and hold the plate securely in the desired adjustment.

Having thus described my invention, I claim—

1. In a tension device, the combination, with a support and a projection secured thereto, of a pivoted plate adapted to bear against the said projection, a projecting edge on the said plate, and a pivoted dog which engages the said projecting edge, substantially as shown and described.

2. In a tension device, the combination, with a support and a projection secured thereto having parallel grooves on its upper side, of a pivoted plate having corresponding grooves in its lower side, a projecting edge formed on the upper side of the said plate, and a dog which engages the said projection, substantially as shown and described.

3. In a tension device, a suitable frame or support, a projection secured thereto having a curved upper edge, a plate pivoted to the said support having a curved lower edge and an inwardly-curved upper edge, a projecting edge on the said pivoted plate, and a dog having ratchet-teeth which engage the said projecting edge, the parts being combined substantially as shown and described.

4. In a tension device, a suitable frame or support, a projection secured thereto having a curved grooved upper edge, a pivoted plate having a curved grooved lower edge and an inwardly-curved upper edge, an upwardly-projecting edge on the said plate, and an eccentrically-pivoted ratchet-dog adapted to engage the said projecting edge, the parts being combined substantially as shown and described.

In testimony whereof I affix my signature in presence of two witnesses.

CHARLES E. WINTRODE.

Witnesses:
A. M. MARSHALL,
JOE DAVIES.